No. 627,639. Patented June 27, 1899.
J. C. EAMES.
TRICYCLE FOR INVALIDS.
(Application filed Aug. 18, 1898.)
(No Model.)

Witnesses,

Inventor
John C. Eames
Dewey Strong & Co.
Attys.

THE NORRIS PETERS CO., PHOTO-LITHO., WASHINGTON, D. C.

UNITED STATES PATENT OFFICE.

JOHN C. EAMES, OF SAN FRANCISCO, CALIFORNIA.

TRICYCLE FOR INVALIDS.

SPECIFICATION forming part of Letters Patent No. 627,639, dated June 27, 1899.

Application filed August 18, 1898. Serial No. 688,873. (No model.)

*To all whom it may concern:*

Be it known that I, JOHN C. EAMES, a citizen of the United States, residing in the city and county of San Francisco, State of California, have invented an Improvement in Tricycles for Invalids; and I hereby declare the following to be a full, clear, and exact description of the same.

My invention relates to improvements in tricycles of that class which are manumotive, or propelled by hand-power.

It consists, essentially, in details of construction, which will be more fully explained by reference to the accompanying drawings, in which—

Figure 1:
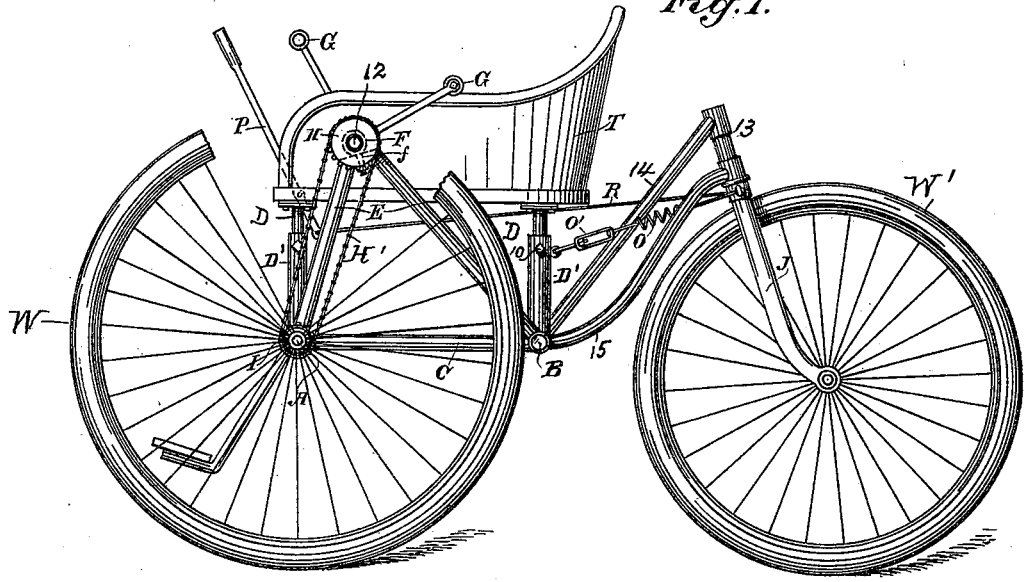
Figure 2:
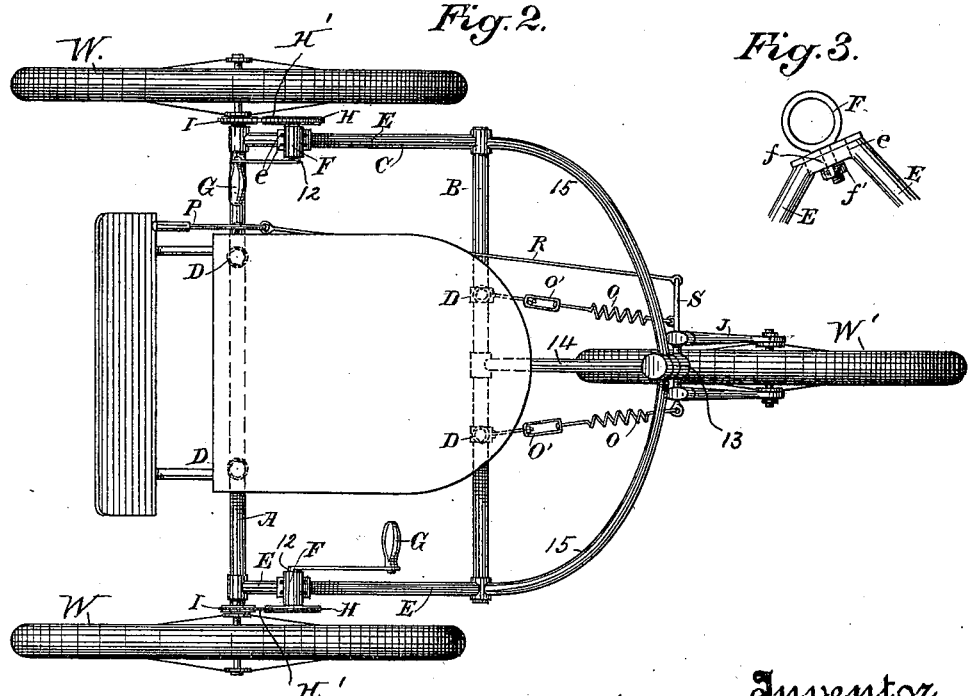
Figure 3:
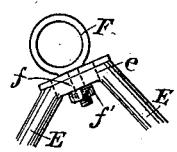

Figure 1 is a side elevation. Fig. 2 is a plan view. Fig. 3 is a detail of the journal of the driving-sprocket, showing the manner of adjusting it in relation to the chain.

The object of my invention is to provide improvements in machines of that class which are driven by hand-power; and my improvements consist more particularly in the construction of the frame and connected parts, the means for driving, and the attachments therefor.

The frame is made of steel tubing, is rectangular in form, and comprises two horizontal and transverse bars A B, standing parallel with each other and connected by the bars C, which extend between them, forming a rectangle.

The seat T is supported upon tubular posts D by means of corresponding posts D', secured to it and extending into these tubular posts, and the height of the seat may be adjusted by raising or lowering. It is secured at any point by the usual holding or set screws 10. When thus fixed, the rigidity of the superposed seat-frame is added to that of the main frame to prevent its being readily twisted out of shape.

The driving-shafts 12 are journaled in boxes F at each side of the seat. These boxes are supported upon converging tubular brace-rods E, the upper ends of which are united and carry the sleeves of the journals, and the lower ends diverge and are fixed, respectively, to the ends of the frame-bars A and B. This construction makes an exceedingly rigid brace and support, and the whole frame is so united that it is not liable to twist out of shape by reason of varying strains upon it.

The journal-shafts, supported in the boxes F, have hand-cranks G, which project inwardly close to the seat, so that the rider can easily turn them.

Upon the outer ends of the shafts are sprocket-wheels H, and from these sprocket-wheels chains H' extend to and around corresponding sprocket-wheels I upon the wheel-hubs. The wheels W being journaled to turn independently upon their bearing-shafts, it will be manifest that either wheel may be turned faster than the other and thus act to steer the machine within certain limits.

When it is desired to turn the machine more abruptly and quickly, it is done by means of a lever P, fulcrumed to the frame within easy reach of the rider and having a connecting-rod R, extending backwardly to a lever-arm S, which projects from one side of the fork J of the steering-wheel W'. This fork is normally retained centrally and is returned to that position when steering pressure is relieved by means of springs O, connecting with the sides of the fork at one end and diverging from these points to the rear vertical posts D, to which the opposite ends are attached. The head of the steering-wheel socket 13 is connected with an inclined brace-rod 14, secured to the rear bar B, and the ends of this rear bar are connected with the base of the socket by means of bars 15, which diverge from the socket toward said ends.

Intermediate in the length of the springs O are fixed turnbuckles O', by which the tension upon either of the springs may be altered independently of the other, and thus any variation can be readily taken up, so that the steering-wheel will always travel normally in the proper direction.

In order to adjust the driving-chains and keep them at the proper tension, any of the usual or well-known adjusting devices may be employed. I have here shown the journal-boxes F slidably mounted upon inclined slotted surfaces at the upper ends and junction of the converging supporting-bars E. These journal-boxes have screw-threaded shanks *f*, which pass through slots *e* in the inclined surface at the upper ends of the bars E, and these bolts are locked by nuts screwing upon them, as shown at *f'*, so that by moving the journal-boxes upon the inclined surfaces the chains may be slackened or tightened, after which the nuts $f'$ are again tightened.

Having thus described my invention, what I claim as new, and desire to secure by Letters Patent, is—

1. An improved tricycle consisting of a rectangular frame, a front axle, wheels upon each end thereof, a single rear wheel, vertical posts rising from each side of the center of one of the rear transverse frame-bars and also from each side of the center of the front axle, steering devices connected with the rear wheel and a lever at the front for operating the same, adjustable spring connections between the steering devices and the said posts of the rear transverse frame-bar, a seat mounted upon said posts, independent crank-axles upon each side of said seat and independent sprockets and chains connecting the crank-axles with opposite ends of the front axle.

2. A tricycle-frame consisting of a rectangle formed of the front main axle, a rear bar parallel therewith and longitudinal connecting-bars, a steering-wheel socket with an inclined brace-rod connecting the rear bar of the frame with its head and divergent bars connecting the ends of the rear bar with the base of the socket, tubular vertical seat-supporting posts extending upwardly from opposite sides of the center of the axle and rear bar and upwardly-converging bracing-bars having their lower ends connecting with the front and rear bars of the frame and the upper ends united to form a support for the crank-axle journal-boxes and independent crank-axles mounted in said boxes and power connections between the crank-axles and the front axle.

In witness whereof I have hereunto set my hand.

JOHN C. EAMES.

Witnesses:
S. H. NOURSE,
JESSIE C. BRODIE.